Jan. 27, 1925.                                              1,524,136
H. KAPFERER ET AL
VEHICLE FITTED WITH WHEELS AT LEAST SOME OF WHICH HAVE TO BE SELF SETTING
Filed Feb. 17, 1922

Inventors:
Henry Kapferer and
Maurice Kapferer
by Emil Bonnelycke
Attorney.

Patented Jan. 27, 1925.

1,524,136

UNITED STATES PATENT OFFICE.

HENRY KAPFERER AND MAURICE KAPFERER, OF PUTEAUX, FRANCE.

VEHICLE FITTED WITH WHEELS AT LEAST SOME OF WHICH HAVE TO BE SELF-SETTING.

Application filed February 17, 1922. Serial No. 537,333.

*To all whom it may concern:*

Be it known that we, HENRY KAPFERER and MAURICE KAPFERER, citizens of the Republic of France, and residents of 6 Rue Jean-Jaures a Puteaux, Departement de la Seine, France, have invented certain new and useful Improvements in Vehicles Fitted with Wheels at Least Some of Which Have to be Self-Setting, of which the following is a specification.

This invention relates to vehicles of the type in which a road wheel is mounted upon a stub shaft arranged to pivot about a normally vertical swivelling pin and in which the axis of suspension of the body lies below the axis of the wheels.

It is found that when a vehicle of the foregoing type is being towed by another vehicle the steering of the trailer will be much improved if the wheels are attached to the body so as to form an automatic swivelling connection as in a castor wheel such as is used on furniture. This automatic swivelling can be obtained by means of the usual swivelling pin if this pin be canted according to the direction in which the trailer is moving and accordingly it is an object of the invention to obtain this result.

We therefore provide in a trailer vehicle of the type specified a construction such that when the body of the vehicle is displaced longitudinally relatively to the axis of the wheels then the vertical axis of the swivelling pin is inclined so that its plane of inclination still passes through or approximately through the wheel axis and the axis of suspension of the body. This longitudinal displacement of the body relatively to the wheel base occurs automatically when the trailer is set in motion since the body of the trailer is attached to the towing vehicle and consequently tends to leave the wheels behind when it starts, such result being facilitated by the usual link suspension between the vehicle body and the springs.

The features of the invention will now be more explicity set forth with reference to the accompanying drawings in which:

Figs. 1 and 2 respectively are a diagrammatic side view and a diagrammatic plan view of a trailer provided with self-setting wheels embodying our invention, the full lines showing the trailer at rest and the dotted lines the position assumed by the trailer respecting its wheels as soon as it undergoes a pulling stress.

Trailer $a$ being of any construction, the coupling is made in such a way that it will not permit said trailer to move round a vertical axis respecting the drag-car, for which purpose the device can advantageously be composed of elements adapted to allow on the one hand, the trailer to oscillate, relative to the car it has to follow, round an axis perpendicular to its plane of symmetry, and, on the other hand, to prevent the trailer from moving round a vertical axis, respecting again the car it has to follow.

And as regards the said rolling system, supposing for instance it to be constituted of two wheels mounted on the ends of one and the same axle, the two wheels $b$ have axletree arms mounted like the steering wheels of a motor car so as to be able to pivot respecting their axle $c$ round a vertical or substantially vertical axis $c°$.

Figure 3:
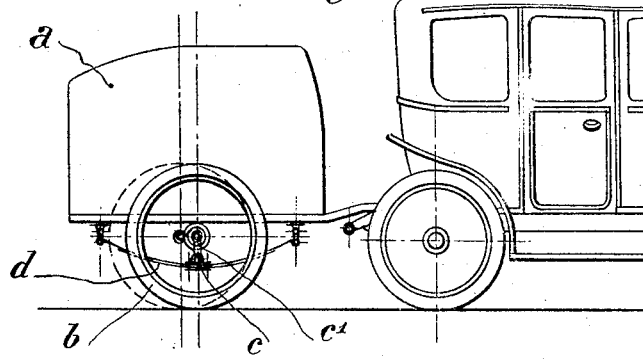
Fig. 3 is an elevation of a trailer fitted with self-setting wheels according to our invention, the dotted lines of which show the position of the wheels before it has been subjected to a pull.
Figure 4:
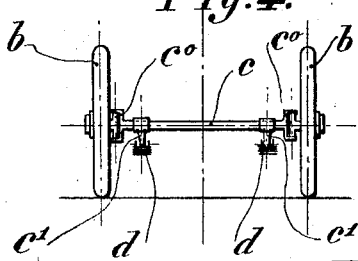
Fig. 4 is an elevation, in a plane transversal to the said trailer, of the axle and wheels thereof.

But instead of securing the said axle to the chassis of the trailer in the ordinary manner, either directly or by means of springs, it is secured in such a way that, on the one hand, the point of application of the weight of the trailer is on a transverse axis $c$ located considerably below the axis $b'$ that passes through the axletree arms and therefore through the center of the wheels, and that, on the other hand, the wheels can oscillate round the said transverse axis C. With the method of performing our invention shown by Figs. 3 and 4, we use an ordinary axle $c$ to which we secure two downwardly directed arms $C'$, and we link the lower end of the said arms to the suspension springs $d$.

Figure 5:
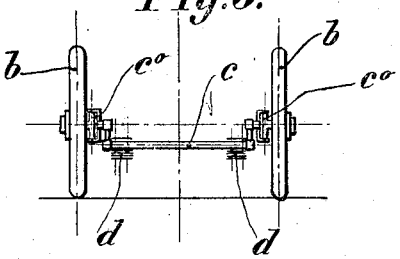
Figs. 5 and 6 show respectively and in the same way an axle and wheels designed according to a second and third manner of performing our invention.

In another manner of performing our invention illustrated by Fig. 5, we provide the axle with a cranked part which we also link to the suspension springs or the cranks of which are linked at their lower part.

Figure 1:
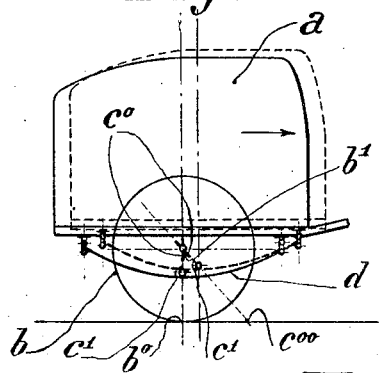
Figure 2:
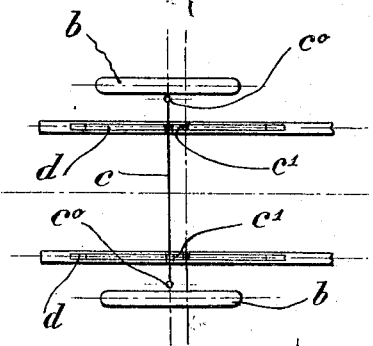
Figure 6:
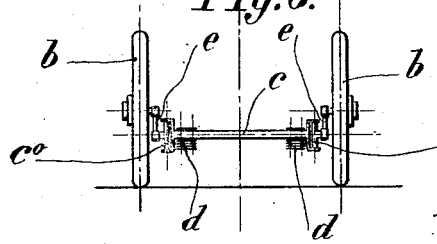

In yet another manner represented by Fig. 6 we mount the axletree arm of each wheel on the end of a lever arm $e$ journaled on a horizontal axle which pivots round the vertical or substantially vertical axis $c°$ of the axletree. Thereby we obtain a trailer in which, when at rest, the transverse axis $c$ around which the wheels are permitted to oscillate is, due to the weight of the trailer, in the same vertical transverse plane as axis $b'$ passing through the axletree arms. But as soon as the trailer is pulled under way either forward or reverse, then, due to the reaction of the ground against the tractor stress, the wheels remain momentarily in place while the body of the trailer begins to advance as shown by dotted lines at Fig. 1. The result is that, on the one hand, the intersection point $c°$ of the ground and of the axes $c°°$ round which the axletree arms and the wheels pivot advance and move away from the contact point $b°$ of the wheel and of the ground, and, on the other hand, the said axis $c°$ assumes an increasing incline which occasions a relifting of axis $c$ and, therefore, a slight lift of the body of the trailer until the weight of the trailer suffices to oppose this motion by overcoming the resistance offered by the ground to the rotation of the wheels. Now, at this moment the distance between points $c°°$ and $b°$ is sufficient to ensure self-setting of the wheels.

Good working of the self-setting wheels is all the better ensured due to the fact that if the wheels are properly set, they offer no serious resistance to progress and it matters but little whether they become longitudinally displaced and whenever they are improperly set, their resistance is sufficient to cause their longitudinal displacement, which displacement will hinge them into such a position regarding their pivoting axis that their setting must be effected, as occurs with rollers of armchairs.

Having now particularly described and ascertained the nature of our said invention as well as some manners in which the same is to be performed, what we claim is:

1. In a trailer comprising a body; two rigid arms associated with said body; springs connected to said body each mounted on a substantial vertical pivot in a mounting; a pair of directing wheels; a shaft for each wheel above said springs; and a connecting rod connecting the mounting of each wheel to the springs to permit the oscillation of each pivot.

2. In a trailer comprising a body; two rigid arms associated with said body; springs connected to said body; a pair of directing wheels; a shaft for each wheel above said springs; a connecting rod connecting each shaft to the spring to permit the oscillation of each shaft; and means for inclining the connecting rods and the shafts downwardly and forwardly.

In testimony whereof we affixed our signatures.

HENRY KAPFERER.
MAURICE KAPFERER.